United States Patent Office 3,344,143
Patented Sept. 26, 1967

3,344,143
PROCESS FOR PRODUCING ALKENYL PYRIDINES
Roy William Sudhoff, Decatur, Ala., assignor to Monsanto Company, St. Louis, Mo., a corporation of Delaware
Filed Dec. 31, 1964, Ser. No. 422,516
7 Claims. (Cl. 260—290)

ABSTRACT OF THE DISCLOSURE

A process for the dehydrogenation of alkyl pyridines in the presence of a diluent and a catalyst wherein the temperature of the reactants is increased as the reactants pass through the catalyst bed.

---

The present invention relates to the production of alkenyl pyridines. More particularly, the present invention relates to a process for the catalytic dehydrogenation of alkyl pyridines.

It is an object of the present invention to provide a new and novel process for increasing dehydrogenation conversions of alkyl pyridines to corresponding alkenyl pyridines. Another object is to provide a new method of increasing the dehydrogenation conversion of ethylpyridines to vinylpyridines with no significant decrease in yield. Additional objects of the present invention will become apparent from the following description.

According to the present invention and in fulfillment of the foregoing and other objects, it has now been discovered that an increase in the conversion of alkyl pyridines to alkenyl pyridines is accomplished by feeding a stream of alkyl pyridines to a dehydrogenation catalyst bed-containing reactor at a temperature which is lower than the usual and ordinary dehydrogenation reaction temperature. Thereafter, the temperature of the alkyl pyridines in the reactor is continuously raised by means of indirect heat energy as the treated alkyl pyridines pass through the catalyst bed, so that the temperature of the treated alkyl pyridines upon leaving the reactor is higher than upon entering the reactor.

In the practice of the present invention several different inert diluents may be used, including carbon dioxide, hydrogen, methane, nitrogen, and steam. Steam is a preferred inert diluent. When steam is used as a diluent, no additional steam or alkyl pyridine is introduced into the reactor past the reactor inlet. Dilution ratios used range from 15 weights steam to 1 weight alkyl pyridine charged down to about 2:1; usually 2:1 to 10:1 is optimum. However, it is possible to add steam or alkyl pyridine in small quantities, if desired, and still utilize the present invention. All heat energy added to the reactants should be added indirectly such that no physical contact between the reaction components and the heating medium is experienced. Such devices as coils in the catalyst bed, through which steam, flue gases, or other heating mediums are passed, can be used. Also applicable would be a tubular type reactor with the catalyst contained in the tubes and a heating fluid passed through the shell containing the tubes. The use of electrical coils surrounding the catalyst bed or perhaps wound inside the catalyst bed is another means which could be used for adding heat to the reactants.

The flow-rates optimally range 1 to 5 liquid volumes of alkyl pyridine charge per volume of catalyst per hour, which corresponds to approximately 170 to 850 volumes gaseous alkyl pyridine (calculated at standard temperature and pressure) per volume catalyst per hour. A general flow-rate range is 0.5 to 10 liquid volumes of alkyl pyridine charge per volume of catalyst per hour.

Temperatures used for the reaction are preferably in the range of 1000° F. to 1300° F. The amount of temperature rise required to practice the invention is dictated by the alkyl pyridine to be dehydrogenated and the economics of the process. Generally speaking, however, any noticeable conversion increase can more than offset the cost of additional heat energy necessary to raise the temperature of the reacting alkyl pyridine in the reactor, any temperature rise across the catalyst bed in the range of 10° C. to 100° C. will show a significant increase in conversion; a temperature rise of 25° C. to 75° C. being optimal.

Preferable total pressures are generally in the range from 100 mm. of mercury to 25 p.s.i.g., although pressure is not a controlling factor in the present invention.

Any dehydrogenation catalyst, such as iron oxide-chromia-potassium hydroxide, and the like, may be used. Some favored catalysts in the practice of the present invention include a catalyst comprising a major proportion by weight of iron oxide, a minor proportion by weight of chromium oxide, and a minor proportion by weight of compound selected from the group consisting of alkali metal oxides, hydroxides and carbonates. Representative general formulas of some such favored catalysts include (1) iron oxide promoted with from 0.5 to 15 percent of chromium oxide, and from 0.5 to 60 percent (calculated as the oxide) of a compound selected from the group of alkali metal oxides (such as potassium oxide, and the like), hydroxides and carbonates, said percentages being percentages by weight based on the iron oxide calculated as $Fe_2O_3$; and (2) iron oxide plus from 0.5 to 15 percent chromia and from 0.5 to 60 percent potassia (preferably 0.5 to 15 percent potassia, present as at least one of potassium oxide, hydroxide, and carbonate), said percentages being percentages by weight based on the iron oxide calculated as $Fe_2O_3$.

Reactor size has no bearing on the operation of the present invention, but it is assumed that the optimum size to give the proper residence time, as is usual in this type of dehydrogenation reaction, will be used.

Reactor configuration is likewise unimportant. This invention can be practiced successfully in reactors of different configurations, including fixed bed reactors and tubular reactors.

The process of the present invention is particularly applicable to alkyl pyridines in which at least one alkyl group is present which contains at least two carbon atoms. Di-, tri-, and tetraalkyl pyridines can be dehydrogenated with the alkyl substituents being present in various positions in the pyridine nucleus. Polyvinylpyridines, as well as monovinylpyridines can be prepared according to this process. It is understood that the vinylpyridines produced can contain one or more vinyl groups and also one or more alkyl groups, particularly the methyl group. 2-methyl-5-ethylpyridine is one of the preferred alkyl pyridines in the practice of this invention. Other alkyl pyridines useful in the practice of this invention include 2-ethyl-4-ethylpyridine, 2-ethylpyridine, 2-ethyl-5-ethylpyridine, 3-ethylpyridine, 3-propylpyridine, and 2-n-amylpyridine. Alkyl quinones and other compounds having at least one alkyl group, containing at least two carbon atoms, attached to a pyridine nucleus and further having non-interfering groups attached to or fused with the pyridine nucleus, can also be dehydrogenated by the process of the present invention. Examples are ethylquinolones, alkyl pyridines having a chlorine or nitro group substituted on a carbon atom of the pyridine nucleus, and the like.

The present invention may be practiced in conjunction with the use of carriers not substantially affecting the catalyst, other than by extending the surface, as well as carriers or other solids having catalytic and/or promoting effects.

Depth of the catalyst bed can be varied, depending on the most economical depth for the alkyl pyridine feed rate and the amount of heat that must be added in the area and dwell time available. Any depth from about 6 inches up to approximately 50 feet can be used in practicing this invention; a catalyst bed of from 2 feet to about 6 feet being optimal.

To further described and to illustrate the present invention, the following examples are presented. These examples are in no manner to be construed as limiting to the present invention.

EXAMPLE I 2-methyl-4-ethylpyridine is dehydrogenated over a catalyst comprising approximately 93 weight percent iron oxide, 5 weight percent chromium oxide and 2 weight percent potassium hydroxide to produce 2-methyl-5-vinylpyridine. A tubular reactor is provided with a preheating section, and a catalyst section is employed. Water is vaporized, the vapor heated to 400° F. to 600° F., and the 2-methyl-5-ethylpyridine injected into the stream to form a mixture of 2-methyl-5-ethylpyridine and steam. The mixture is then heated to the reaction temperature before being passed over the catalyst. Of 2-methyl-5-vinylpyridine, the weight percent per pass yield is about 33.42, the mol percent per pass yield is about 33.98, the ultimate weight percent yield is about 76.93, and the ultimate mol percent yield is about 78.22.

EXAMPLE II 2-methyl-5-ethylpyridine is dehydrogenated over a catalyst comprising approximately 93 weight percent iron oxide, 5 weight percent chromium oxide and 2 weight percent potassium hydroxide to produce 2-methyl-5-vinylpyridine. A tubular reactor is provided with a preheating section, and a catalyst section is employed. Water is vaporized, the vapor heated to 400° F. to 600° F., and the 2-methyl-5-ethylpyridine injected into the stream to form a mixture of 2-methyl-5-ethylpyridine and steam. The mixture is then fed to a dehydrogenation catalyst bed-containing reactor at a temperature of about 950° F. As the mixture is passed through the catalyst bed, heat is continually applied by electric heaters spaced along the entire length of the catalyst bed. A quantity of heat sufficient to cause a rise in the temperature of the reactants of about 90° F. is continually supplied so that at the exit of the reactor the temperature of the reactants is about 1040° F. The composition of the reaction mixture is found to contain a substantially higher percentage yield of 2-methyl-5-vinylpyridine than in Example I— in weight percent per pass yield, mol percent per pass yield, ultimate weight percent yield, and ultimate mol percent yield.

EXAMPLE III 2-methyl-5-ethylpyridine is dehydrogenated over a catalyst comprising approximately 67 weight percent $Fe_2O_3$, 3 weight percent $Cr_2O_3$ and 30 weight percent KOH to produce 2-methyl-5-vinylpyridine. A tubular reactor is provided with a preheating section and a catalyst section is employed. Water is vaporized, the vapor heated to 400° F. to 600° F., and the 2-methyl-5-ethylpyridine injected into the stream to form a mixture of the 2-methyl-5-ethylpyridine and steam. The mixture is then heated to the reaction temperature before being passed over the catalyst. Of 2-methyl-5-vinylpyridine, the weight percent per pass yield is about 31.44, the mol percent per pass yield is about 31.96, the ultimate weight percent yield is about 70.09, and the ultimate mol percent yield is about 71.25.

EXAMPLE IV 2-methyl-5-ethylpyridine is dehydrogenated over a catalyst comprising approximately 67 weight percent $Fe_2O_3$, 3 weight percent $Cr_2O_3$ and 30 weight percent KOH to produce 2-methyl-5-vinylpyridine. A tubular reactor is provided with a preheating section and a catalyst section is employed. Water is vaporized, the vapor heated to 400° F. to 600° F., and the 2-methyl-5-ethylpyridine injected into the stream to form a mixture of the 2-methyl-5-ethylpyridine and steam. The mixture is then fed to a dehydrogenation catalyst bed-containing reactor at a temperature lower than the reaction temperature. As the mixture is passed through the catalyst bed, heat is continually applied by steam coils spaced along the entire length of the catalyst bed. A quantity of heat in excess of that required to propagate the reaction is continually supplied so that at the exit of the reactor the temperature of the reactants is in excess of the reaction temperature. The composition of the reaction mixture is found to contain a substantially higher percentage yield of 2-methyl-5-vinylpyridine than in Example III— in weight percent per pass yield, mol percent per pass yield, ultimate weight percent yield and ultimate mol percent yield.

EXAMPLE V 2-methyl-5-ethylpyridine is dehydrogenated over a catalyst comprising approximately 93 weight percent iron oxide, 5 weight percent chromium oxide, and 2 weight percent potassium hydroxide to produce 2-methyl-5-vinylpyridine. A tubular reactor is provided with a preheating section, and a catalyst section is employed. 2-methyl-5-ethylpyridine is fed liquid-phase to the preheating section. Simultaneously, water, previously vaporized and the steam heated to about 1350° F., is fed to the preheating section and this mixture is passed to the catalyst section, where dehydrogenation is accomplished at essentially atmospheric total pressure. Of 2-methyl-5-vinylpyridine, the weight percent per pass yield is about 33.7 to 49.2, and the ultimate weight percent yield is about 73.5 to 79.9.

EXAMPLE VI 2-methyl-5-ethylpyridine is dehydrogenated over a catalyst comprising approximately 93 weight percent iron oxide, 5 weight percent chromium oxide, and 2 weight percent potassium hydroxide to produce 2-methyl-5-vinylpyridine. A tubular reactor is provided with a preheating section, and a catalyst section is employed. 2-methyl-5-ethylpyridine is fed liquid-phase to the preheating section. Simultaneously, water, previously vaporized and the steam heated to a temperature lower than the reaction temperature, is fed to the preheating section and this mixture is then fed to a dehydrogenation catalyst bed-containing reactor at a temperature lower than the reaction temperature. As the mixture is passed through the catalyst bed, heat is continually applied by electric heaters spaced along the entire length of the catalyst bed. A quantity of heat in excess of that required to propagate the reaction is continually supplied so that at the exit of the reactor the temperature of the reacants is in excess of the reaction temperature. The composition of the reaction mixture is found to contain a substantially higher percentage yield of 2-methyl-5-vinylpyridine than in Example V—in weight percent per pass yield and in ultimate weight percent yield.

An important reason why increases in conversions occur in the present invention is apparently because of the high temperatures attained at the exit of the reactor which prohibit the equilibrium point in the reaction from being reached and thus keep the reaction actively proceeding until the reactants leave the reactor.

A particular advantage of this invention is the greatly increased conversion of alkyl pyridines to alkenyl pyridines which was unexpected in view of numerous reaction schemes in the prior art which were not significant enough to justify changes in the usual and normal method used predominantly in the commercial process of dehydrogenating alkyl pyridines.

Another advantage of the present invention is that any steam added with the alkyl pyridine need not be superheated as much as required in the prior art. Although heat energy is saved at this point, it is added subsequently in the catalyst bed to raise the temperature of the reaction components there. However, more of the heat energy added to the catalyst bed is converted to the heat of reaction necessary to form the alkenyl pyridine and, therefore, is used much more efficiently.

Still another advantage of the present invention is that less thermal decomposition occurs prior to reaction than occurs in the prior art, and thus higher yields are attained. This is true because the inlet temperatures used in this reaction are generally lower than those in the prior art, in which all the heat must be supplied prior to reaction.

What is claimed is:

1. A process for dehydrogenating an alkyl pyridine, which comprises: feeding a reactant mixture of steam and said alkyl pyridine into a pre-heating section; pre-heating said reactant mixture to a temperature of 10° C. to 100° C. lower than a reaction temperature of said reactant mixture; and thereafter passing said pre-heated reactant mixture through a dehydrogenation catalyst bed while adding heat energy to said reactant mixture to continuously raise the temperature of said reactant mixture throughout the time said reactant mixture passes through said catalyst bed, whereby at an exit of said reactor the temperature of said reactant mixture is in excess of said reaction temperature.

2. A process for dehydrogenating 2-methyl-5-ethylpyridine which comprises: passing a mixture of 2-methyl-5-ethylpyridine and from 2 to 15 weights steam per weight of said 2-methyl-5-ethylpyridine into a pre-heating section; subjecting said mixture in said pre-heating section to a temperature sufficient to produce a temperature of said mixture of about 950° F.; thereafter passing said pre-heated mixture at about said temperature into a reactor containing a dehydrogenation catalyst bed comprising iron oxide plus from 0.5 to 15 percent chromium oxide and from 0.5 to 15 percent potassium hydroxide; applying heat to said mixture along the length of said catalyst bed sufficient to cause a temperature rise in said mixture of about 90° F., whereby at an exit of said reactor the temperature of reactants of said mixture is about 1040° F.; and recovering 2-mehyl-5-vinylpyridine so produced.

3. The process of claim 1, wherein said alkyl pyridine is selected from the group consisting of 2-methyl-5-ethylpyridine, 2-ethyl-4-ethylpyridine, 2-ethylpyridine, 2-ethyl-5-ethylpyridine, 3-ethylpyridine, 3-propylpyridine, and 2-n-amylpyridine.

4. The process of claim 1, wherein said alkyl pyridine is 2-methyl-5-ethylpyridine.

5. The process of claim 1, wherein said reaction temperature is in the range of about 1000° F. to 1300° F.

6. The process of claim 1, wherein said catalyst bed comprises a major proportion by weight of iron oxide, a minor proportion by weight of chromium oxide, and a minor proportion by weight of a compound selected from the group consisting of alkali metal oxides, hydroxides and carbonates.

7. The process of claim 1, wherein said reactant mixture comprises an alkenyl pyridine and from 2 to 15 weights steam per weight of said alkyl pyridine.

References Cited
UNITED STATES PATENTS

| | | | |
|---|---|---|---|
| 2,866,790 | 12/1958 | Pitzer | 260—290 |
| 2,870,154 | 1/1959 | Pitzer | 260—290 |
| 2,888,499 | 5/1959 | Pitzer | 260—290 |
| 3,168,524 | 2/1965 | Mahan et al. | 260—290 |

WALTER A. MODANCE, *Primary Examiner.*

A. L. ROTMAN, *Assistant Examiner.*